(12) United States Patent
Jheng

(10) Patent No.: US 8,364,145 B2
(45) Date of Patent: Jan. 29, 2013

(54) METHODS AND DEVICES FOR DYNAMIC MENU UPDATE

(75) Inventor: Yu-Syuan Conan Jheng, Yilan County (TW)

(73) Assignee: Mediatek Inc., Hsin-Chu (TW)

( * ) Notice: Subject to any disclaimer, the term of this patent is extended or adjusted under 35 U.S.C. 154(b) by 811 days.

(21) Appl. No.: 11/971,339

(22) Filed: Jan. 9, 2008

(65) Prior Publication Data

US 2009/0178005 A1 Jul. 9, 2009

(51) Int. Cl.
*H04W 4/00* (2009.01)
*H04M 3/42* (2006.01)
*G06F 3/048* (2006.01)

(52) U.S. Cl. ............... 455/435.1; 455/434; 455/440; 455/414.1; 715/825

(58) Field of Classification Search ........... 455/434, 455/435.1, 440, 414.1; 715/825
See application file for complete search history.

(56) References Cited

U.S. PATENT DOCUMENTS

| 5,086,314 | A | | 2/1992 | Aoki et al. | |
|---|---|---|---|---|---|
| 5,613,213 | A | * | 3/1997 | Naddell et al. | 455/435.2 |
| 5,819,173 | A | * | 10/1998 | Lawrence et al. | 455/515 |
| 5,969,974 | A | | 10/1999 | Vandenbelt et al. | |
| 6,061,560 | A | * | 5/2000 | Saboorian et al. | 455/415 |
| 6,167,255 | A | * | 12/2000 | Kennedy et al. | 455/414.1 |
| 6,600,903 | B1 | * | 7/2003 | Lilja et al. | 455/67.11 |
| 7,069,020 | B2 | | 6/2006 | Chung | |
| 7,330,110 | B1 | | 2/2008 | Yu | |
| 2002/0183089 | A1 | * | 12/2002 | Heller et al. | 455/552 |
| 2003/0027595 | A1 | * | 2/2003 | Ejzak | 455/560 |
| 2004/0137913 | A1 | | 7/2004 | Masuda | |
| 2004/0137927 | A1 | * | 7/2004 | Mun | 455/509 |
| 2005/0208892 | A1 | * | 9/2005 | Kotola et al. | 455/41.2 |
| 2006/0172734 | A1 | * | 8/2006 | Tak | 455/433 |
| 2006/0212511 | A1 | * | 9/2006 | Garcia-Martin | 709/203 |
| 2007/0165875 | A1 | | 7/2007 | Rezvani et al. | |
| 2008/0037501 | A1 | * | 2/2008 | Ali et al. | 370/342 |
| 2008/0057917 | A1 | * | 3/2008 | Oria | 455/414.1 |

FOREIGN PATENT DOCUMENTS

| CN | 1498014 | 4/2002 |
|---|---|---|
| CN | 1354589 | 6/2002 |
| CN | 1378759 | 11/2002 |
| CN | 1414812 | 4/2003 |
| JP | 2003134391 | 5/2003 |
| JP | 2004-178363 | 6/2004 |
| TW | 200515775 | 10/2005 |
| WO | WO 2007/068197 | 6/2007 |

OTHER PUBLICATIONS

"True Reality TV: TVP5160"; http://www.ti.com/news/newsdetail.asp?scid=04182, Aug. 30, 2004.
English translation of "True Reality TV: TVP5160"; http://www.ti.com/news/newsdetail.asp?scid=04182, Aug. 30, 2004.
English language translation of abstract of JP 2004-178363 (published Jun. 24, 2004).
English language translation of abstract of WO 2007/068197 (p. 1 of publication, published Jun. 21, 2007).

\* cited by examiner

*Primary Examiner* — Ariel Balaoing
(74) *Attorney, Agent, or Firm* — McClure, Qualey & Rodack, LLP

(57) ABSTRACT

A method for altering man machine interface (MMI) configurations for use in a device is provided. The method comprises the following steps. A status of a service is queried after detecting that an inspection condition is satisfied. The queried status is acquired from the currently associated network. A menu item of a service menu is enabled when the queried status indicates that the service is available. Otherwise, the menu item of the service menu is disabled or the menu item is removed from the service menu when the queried status indicates that the service is unavailable, preventing a user from requesting the service via the menu item.

12 Claims, 10 Drawing Sheets

METHODS AND DEVICES FOR DYNAMIC MENU UPDATE

BACKGROUND OF THE INVENTION

1. Field of the Invention

The invention relates to dynamic menu updating, and more precisely, to methods and devices for promptly updating man-machine interface (MMI) configuration of a menu in response to available services supported by the currently associated network.

2. Description of the Related Art

With the convenience of portable devices, such as mobile phones, smart phones, and PDAs, user can easily carry a portable device when traveling. In addition to basic telecommunication services (such as call setup service), a network provider may provide additional features or services, such as GSM supplementary service (SS) which modifies or supplements a basic telecommunication service, for user selection. These services, however, are selectively provided by different network providers. For example, a call transfer or a call deflect service may be supported by network provider A while not being supported by network provider B. When the portable devices roam from an area governed by network provider A to an area governed by network provider B, the call transfer service is unavailable.

Currently, portable devices show all supported features on its menu. If a service that is not supported by a network provider currently associated and has been chosen from the menu by a user, portable devices may receive error messages or recognize no response from the associated network after issuing one or more requests for the service, resulting in unnecessary consumption of network bandwidth. Moreover, the user may spend unnecessary waiting time before realizing that the chosen service is unavailable, dramatically reducing user satisfaction. It is to be understood that the similar situations are also happened in an environment of wireless networks providing various additional communication methods.

It is therefore desired to provide methods and devices for dynamically updating the MMI configuration of the menu to avoid unnecessary consumption of network bandwidth and increase user satisfaction.

BRIEF SUMMARY OF THE INVENTION

An embodiment of the invention provides a device. The device comprises a storage device, a processing unit and a display unit. The storage device stores man-machine interface (MMI) configurations. The processing unit queries a status of a service after detecting that an inspection condition is satisfied, and acquires the queried status from the currently associated network. The processing unit further enables a menu item of a service menu by altering the stored MMI configurations when the queried status indicates that the service is available, and otherwise, disables the menu item of the service menu or removing the menu item from the service menu by altering the stored MMI configurations when the queried status indicates that the service is unavailable, preventing a user from requesting the service via the menu item. The display unit displays the menu item of the service menu according to the altered MMI configurations.

An embodiment of the invention also provides a method for altering MMI configurations for use in a device. The method comprises the following steps. A status of a service is queried after detecting that an inspection condition is satisfied. The queried status is acquired from the currently associated network. A menu item of a service menu is enabled when the queried status indicates that the service is available. Otherwise, the menu item of the service menu is disabled or the menu item is removed from the service menu when the queried status indicates that the service is unavailable, preventing a user from requesting the service via the menu item.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention will now be described with reference to FIGS. 1 through 10, which generally relate to promptly altering man-machine interface (MMI) configurations in response to available services supported by the currently associated network. In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

The embodiments of the invention provide methods for altering MMI configurations for use in a device so as to update the service menu of the device based on acquired location information from associated network. In some embodiments, when the device enters a new geographic location, the device automatically performs a query operation, such as supplementary service (SS) interrogation, to recognize all services it supports. Then, the device updates MMI configurations of the service menu in response to the query result. Therefore, only available services will be shown in the service menu and can be utilized by a user, preventing the user from selecting a non-supported service.

In some embodiments, the invention can also be applied in a device having capacity of voice over IP (VoIP) communications. When the device is changeably associated with a new session initiation protocol (SIP) server, SIP method "OPTIONS" defined by VoIP RFC 3261 can be utilized to query which services are supported based on the current server, and then alter the MMI configurations of the service menu according to the query results.

Figure 1:
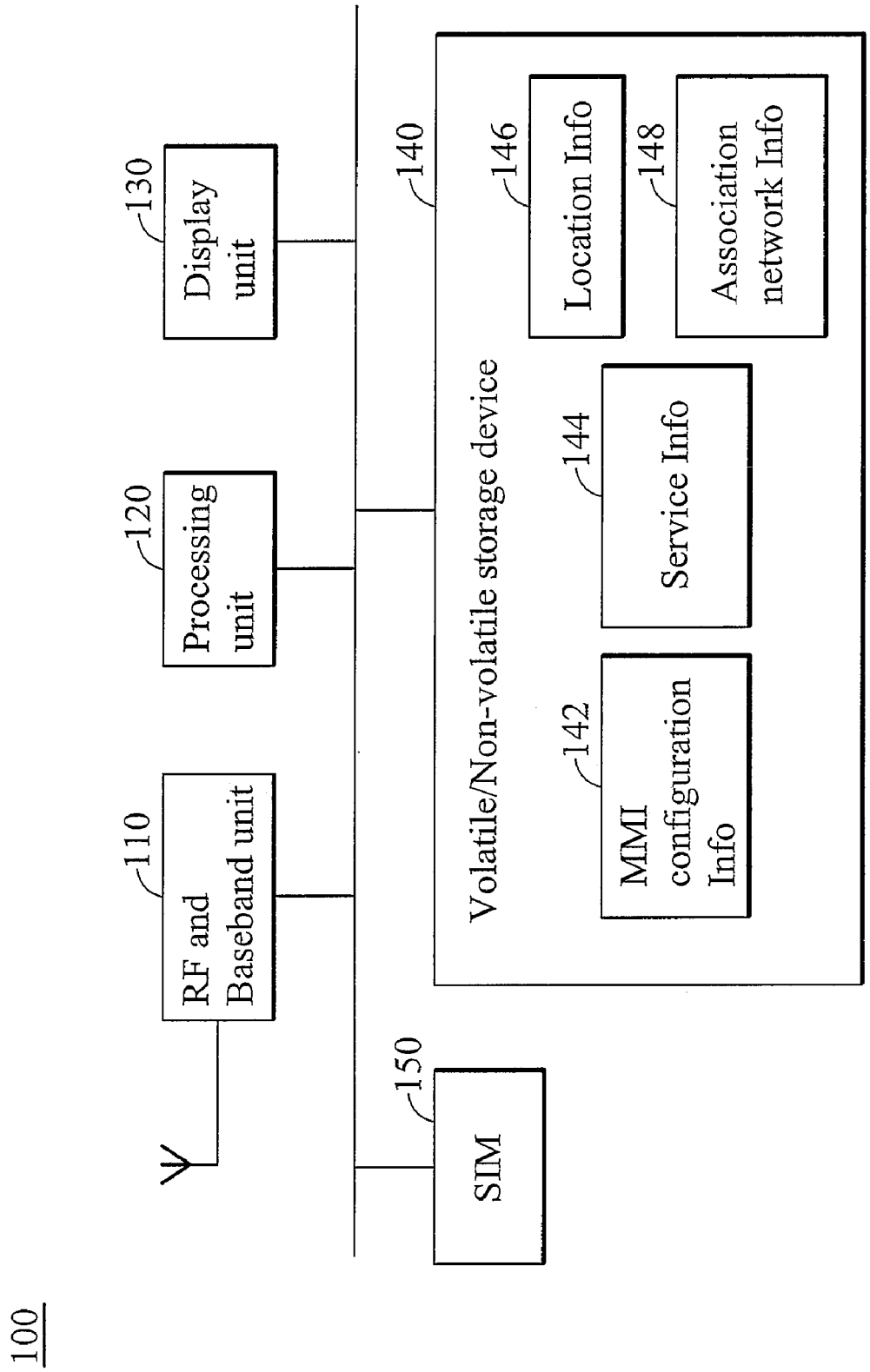
FIG. 1 is a schematic diagram illustrating an embodiment of a device according to the invention.

FIG. 1 is a schematic diagram illustrating an embodiment of a device 100 according to the invention. The device 100 may be a portable device, such as a mobile phone, a smart phone, or a PDA. The device 100 comprises a radio frequency (RF) and baseband unit 110, a processing unit 120, a display unit 130, a storage device 140 and a subscriber identity module (SIM) 150. The RF and baseband unit 110 receives signals from and transmits signals to a current associated network. It is to be understood that integrating the processing unit 120 into the RF and baseband unit 110 is also available. The processing unit 120 performs methods for promptly altering MMI configurations in response to available services supported by the currently associated network. The storage device 140 may be a volatile or non-volatile storage device. The storage device 140 stores MMI configuration information 142, service information 144, location information 146 and association network information 148. The MMI configuration information 142 may be represented by both a MMI table and a display setting table. The MMI table lists information regarding all menu items of a service menu, each including a menu item identity, an icon, display text, a service execution module, and input parameters. The service execution module, when executing by the processing unit 120, requests a service such as a SS, a supported method or others, to a network operator currently associated, handles communication protocols and acquires response results therefrom. The service execution module, when executing, may further perform related operations in response to the acquired results such as storing, displaying the acquired results, or others. The display setting table stores information regarding display properties of all menu items of the service menu. The display properties may comprise normal, disable, hidden or others. When a display property of a menu item is normal, the menu item is displayed on the display unit 130 and can be selected to activate a corresponding service execution module with relevant input parameters by a user. When a display property of a menu item is disable, the menu item is blurred and displayed on the display unit 130, and can not be selected to activate a corresponding service execution module. When a display property of a menu item is hidden, the menu item is unable to be displayed on the service menu. Those skilled in the art may practice a single table to encompass the described MMI configuration information 142. The services information 144 indicates whether each of the possible services is actually supported by a current associated network. The services information 144 may be represented by two tables, one listing all potential services and the other listing service/method actually supported by the current associated network. Each potential service may have an indicator indicating whether the service/method is available or supported by the current associated network. The MMI configurations information 142 may vary with the service information 144 accordingly. For example, when the service information 144 is updated to indicate that a service is not supported by a current associated network, a display property of corresponding menu item is subsequently updated with disable or hidden.

The location information 146 indicates a location obtained from a cell broadcast system such as a base station system, an access point or others. It is to be understood that the location information is broadcast to notify all mobile stations of a geographic area where the cell broadcast system situates. The location information 146 can be utilized to determine whether the device 100 has moved to a new location. For example, the device 100 may listen to a broadcast control channel (BCCH) provided by an associated base station system, and receive system information (SI) from the channel. The SI comprise a location area identity (LAI) comprising a mobile country code (MCC), a mobile network code (MNC), and a location area code (LAC), indicating where the device 100 situates. After acquiring a LAI from an associated base system, the device 100 may compare the currently acquired LAI with the last acquired LAI stored in the SIM 150 or the non-volatile storage device 140 thereof, and accordingly determine whether the device 100 moves to a new location. It is to be understood that the newly acquired LAI will also be stored in the SIM 150 or the non-volatile storage device 140 for further reference.

The association network information 148 indicates a specific network operator providing communication services, such as a specific Public-Land-Mobile-Network (PLMN) operator, a SIP proxy server or others, obtained from a cell broadcast system. It is to be understood that the network operation information is broadcast to notify all mobile stations of that communication services of a specific network are provided by which network operator. The location information 146 can be utilized to determine whether communication service has been changeably provided by a new network operator. For example, the device 100 may listen to a broadcast control channel (BCCH) provided by an associated base station system, and receive system information (SI) from the channel. The SI comprises a PLMN code comprising a mobile country code (MCC), and a mobile network code (MNC). A network operator typically owns a unique PLMN code. After acquiring a PLMN code from an associated base system, the device 100 may compare the currently acquired PLMN code with the last acquired PLMN code stored in the SIM 150 or the non-volatile storage device 140 thereof, and accordingly determine whether communication service has been changeably provided by a new network operator. It is to be understood that the newly acquired PLMN code will also be stored in the SIM 150 or the non-volatile storage device 140 for further reference.

In some embodiments, a device (e.g. 100 of FIG. 1) is applicable in the Global System for Mobile Communications (GSM) network. When the device participates in the GSM network, "SS interrogation" requests can be employed to acquire statuses of supplementary services.

Figure 10:
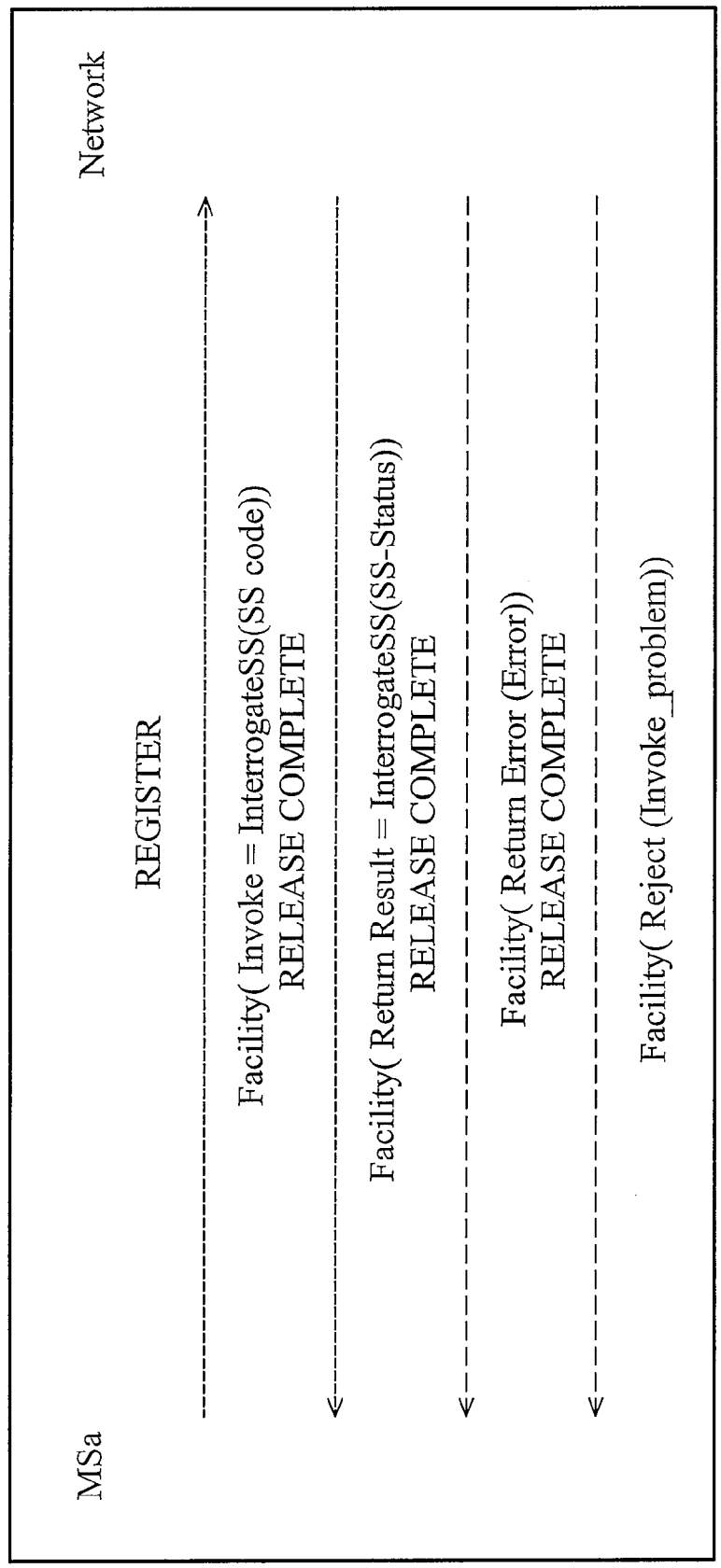
FIG. 10 shows an exemplary SS interrogation procedure.

FIG. 10 shows an exemplary SS interrogation procedure. Interrogation of a supplementary service is the request by a device to the network (PLMN) to provide information about a specific SS and is useful to get information from the currently associated network about the status or relevant data concerning a SS. A SS modifies or supplements a basic telecommunication service. The device (also referred to as a mobile subscriber) can request the status of the SS and be informed if the SS is available. Availability of a specific SS may vary with different users. Referring to FIG. 10, the device (MSa) registers to and queries whether a SS with a specific SS code is supported by the currently associated network using the InterogateSS(SS code) request. SS code, which is detailed in the specification "*ETSI Register of Supplementary services code*", is a two or three digit string used to identify a supplementary service. For example, the SS codes for supplementary services "advice of charge, during call, cumulative", "call deflection", "call transfer", "calling line identification restriction (CLIR)", "closer user group", "completion of calls to busy subscriber" are defined as 462, 66, 96, 31, 01 and 37 respectively. Specifically, the "call transfer" service enables a user who has two calls, either of which can be an incoming call or outgoing call, to connect the two parties together in the two calls. The "call deflection" service enables the served user to respond to an incoming call by requesting redirection of that call to another user and it can only be invoked before the connection is established by the served user. It is to be understood that all of the SS codes defined in the specification "*ETSI Register of Supplementary services code*" can be applied to the invention. The following values may be returned by the currently associated network (PLMN) using a InterogateSS request: not supported, active and operative, active and quiescent, and not active, in normal operation. The currently associated network may return a response of not supported, an error message or a reject message for indicating the requested SS is unavailable during the interrogation procedure, as shown in FIG. 10.

For example, the device (MSa) may register to the network and query whether the supplementary service "call transfer" is supported by the network by issuing InterogateSS(96) request. The network may respond with an SS(not supported) message for informing the device that the queried service (i.e. call transfer) is not supported by the currently associated network. Thus, the device is capable of querying statuses of all possible supplementary services by using the SS interrogation procedure.

In some embodiments, a device (e.g. 100 of FIG. 1) is applicable in a VoIP wireless (also referred to as Wi-Fi) network. When the device participates a VoIP wireless network, a Session Initiation Protocol (SIP) method "OPTIONS" can be employed by the device to acquire the status of at least one service (also referred to as supported method). The SIP method OPTIONS allows to query another device or a SIP proxy server as to its capabilities such as the supported methods, content types, extensions, codecs or others, without "ringing" the queried device or server. For example, when the device is not certain whether the destination device or SIP proxy server supports a specific supported method, the device can query the destination device or SIP proxy server with a SIP method OPTIONS to inspect if the supported method is returned in a "Supported" header field of a return message. The target of the SIP method OPTIONS is identified by the "Request-URI", which may identify another device or a SIP proxy server. Note that, if the SIP method OPTIONS is addressed to a SIP server, the Request-URI is set without a user part.

In some embodiments, the invention can be applied in a device with communication capacity of dual mode such as wireless telephony network/wireless network (e.g. GSM/VoIP) mode. For example, when the device is operated in the GSM mode, a GSM-only service menu may be displayed to indicate SSs supported by the GSM wireless network. When the device is operated in the VoIP mode, a VoIP-based service menu may be displayed to indicate supported methods supported by another device or a SIP proxy server. The MMI configurations of the service menu are altered according to the currently associated network. Specifically, when detecting that the device has roamed into a VoIP only area, the display of a GSM-only service menu is replaced with that of a VoIP-based service menu.

For example, when roaming into a VoIP only area, the device 100 requests the currently associated SIP proxy server to query statuses of possible supported methods. Accordingly, response results are acquired. Then, before displaying a VoIP-based service menu, the display of GSM-only service menu is removed or gray-shadowed. Next, the VoIP-based service menu is displayed and MMI configurations of the VoIP-based service menu of the device 100 are altered in response to the query results.

Alternatively, when roaming back to the GSM area, MMI configurations of the GSM-only service menu of the device 100 are altered in response to the query results, and the display of the VoIP-based service menu is removed or gray-shadowed and the GSM-only service menu is displayed.

Several embodiments of methods for promptly altering MMI configurations in response to available services supported by the currently associated network are provided.

Figure 2:
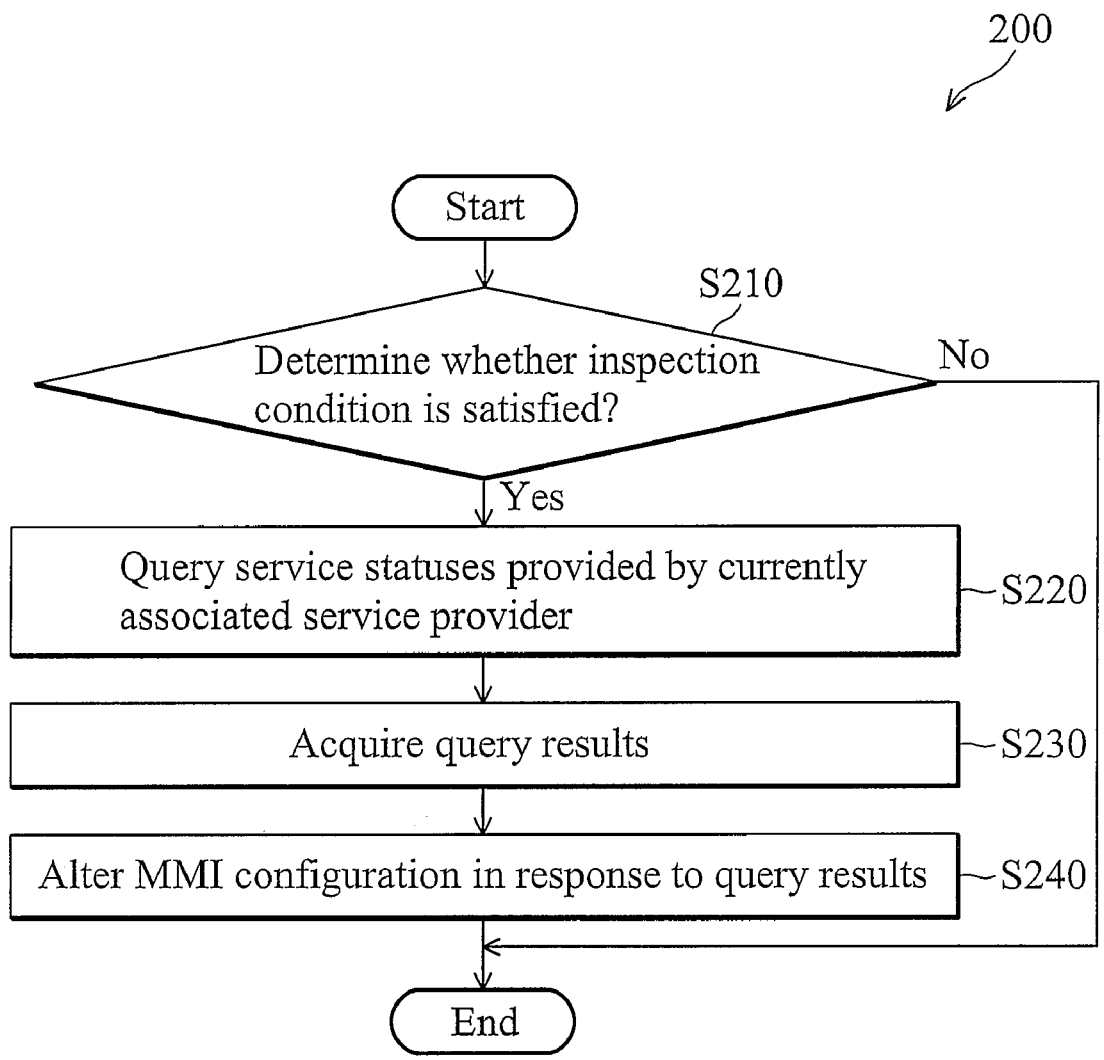
FIG. 2 is a flowchart showing an embodiment of a method for promptly altering MMI configuration according to the invention.

FIG. 2 is a flowchart 200 showing an embodiment of a method for promptly altering MMI configuration according to the invention. In step S210, the device 100 determines whether an inspection condition is satisfied. If so, the process proceeds to step S220, otherwise, the entire process ends. It is to be understood that some of services may be no longer supported or some of non-supported services may be currently supported when the device 100 enters a new location or associates with a new network managed by another network operator. The inspection condition is therefore satisfied when detecting that the device 100 enters a new location or associates with a new network managed by another network operator. Detection of new location entering may be achieved by comparing location information obtained from the currently associated network with the stored location information (e.g. 146 of FIG. 1). Detection of new network association may be achieved by comparing association network information obtained from the currently associated network with the stored association network information (e.g. 148 of FIG. 1). Then, in step S220, the device 100 queries service statuses. Statuses of all possible service (e.g. that present in the service information 144 of FIG. 1) will be automatically queried from the currently associated network by a service discovery procedure. In step S230, query results are then acquired. For example, the service discovery procedure may comprise issuing multiple SS interrogation requests and obtain statuses of all possible services according to SS interrogation responses via a RF and baseband unit (e.g. 110 of FIG. 1) when participating the GSM network. The service discovery procedure may comprise issuing multiple "OPTION" requests and obtain statuses of all possible services according to "OPTION" responses when participating the VoIP wireless network. Thereafter, in step S240, MMI configurations of the device 100 are altered in response to the query results. For example, if a specific service is found to be no longer supported by the currently associated network, a menu item corresponding to this specific service will be disable or removed from the service menu by altering the MMI configurations of the device 100 (e.g. MMI configuration information 142 of FIG. 1) such that this specific service can not be accessed by an user.

Figure 9:
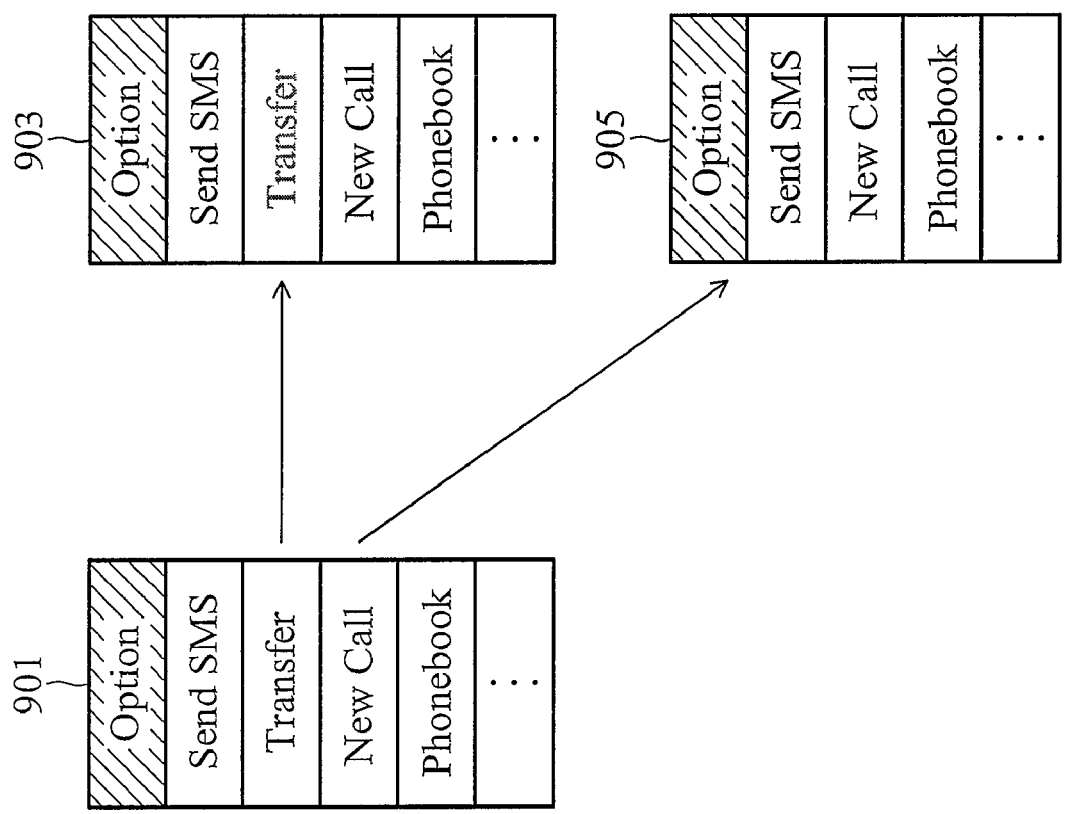
FIG. 9 shows an example of altering MMI configurations according to the invention.

FIG. 9 shows an example for altering MMI configurations of a device according to the invention. Referring to FIG. 9, a menu item "Transfer" of a menu 901 corresponding to original MMI configurations is shown for allowing a user to perform a call transfer service (i.e. one of supplementary services) during an active call or a held call is existed. Once the device detects that the call transfer service is no longer supported by the currently associated telecommunication operator, the MMI configurations are subsequently altered to disable the menu item "Transfer" of the menu as shown in 903 or remove the menu item "Transfer" from the menu as shown in 905 resulting in the call transfer service unable to be accessed by the user.

Figure 3:
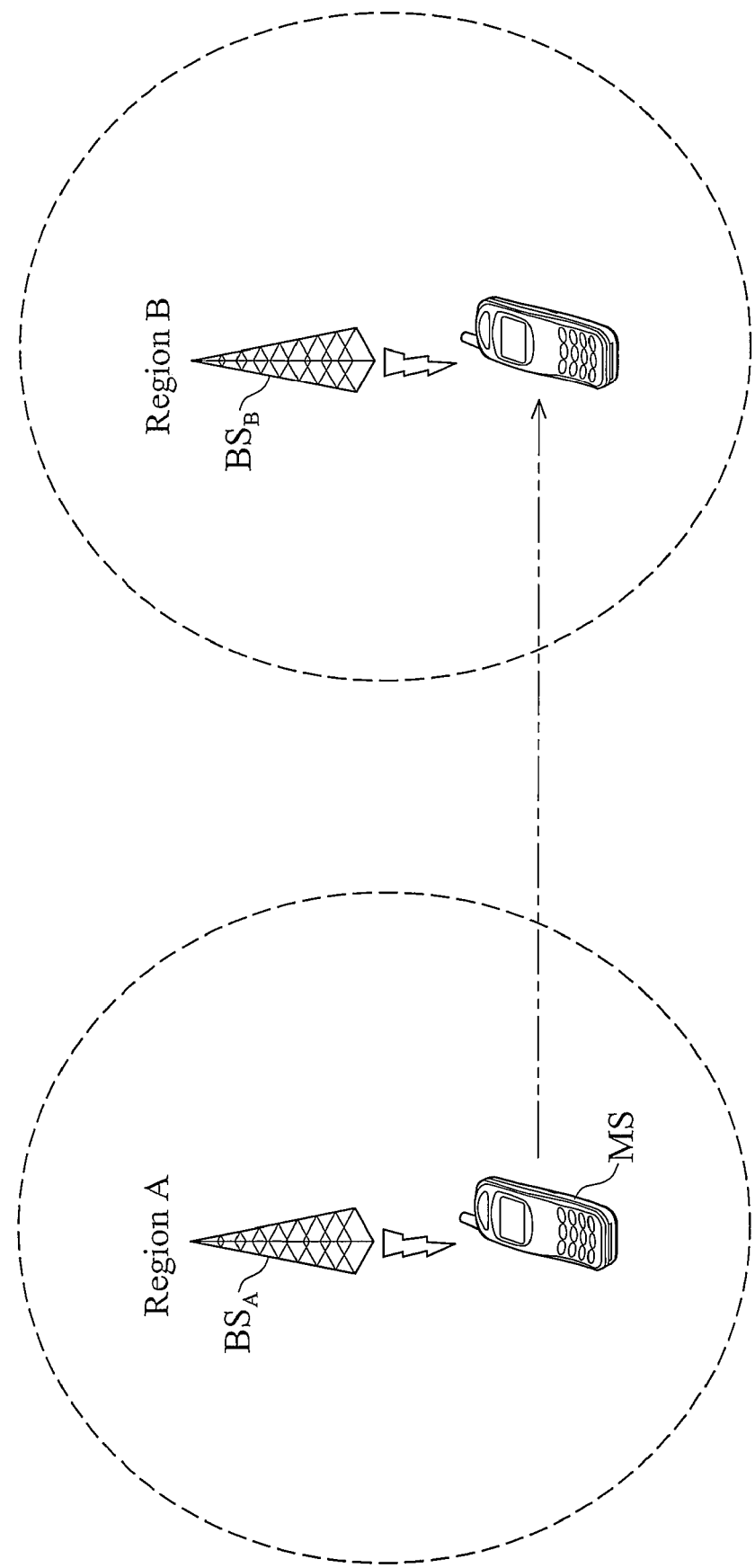
FIG. 3 is a diagram illustrating a scenario that a device is roamed from one location to another according to the invention.

FIG. 3 is a diagram illustrating a scenario that a device is roamed from one location to another according to the invention. In this scenario, the device MS moves from a region A covered by a base station $BS_A$ to a new region B covered by a base station $BS_B$, disconnects from the base station system $BS_A$, connects to the base station system $BS_B$ and detects that system information (SI) broadcasted by the base station system $BS_B$ is different from that by $BS_A$. The device MS may listen to a BCCH from the base station system $BS_B$, and receive SI from the channel. The SI comprises a LAI comprising a MCC, a MNC, and a LAC.

Figure 4:
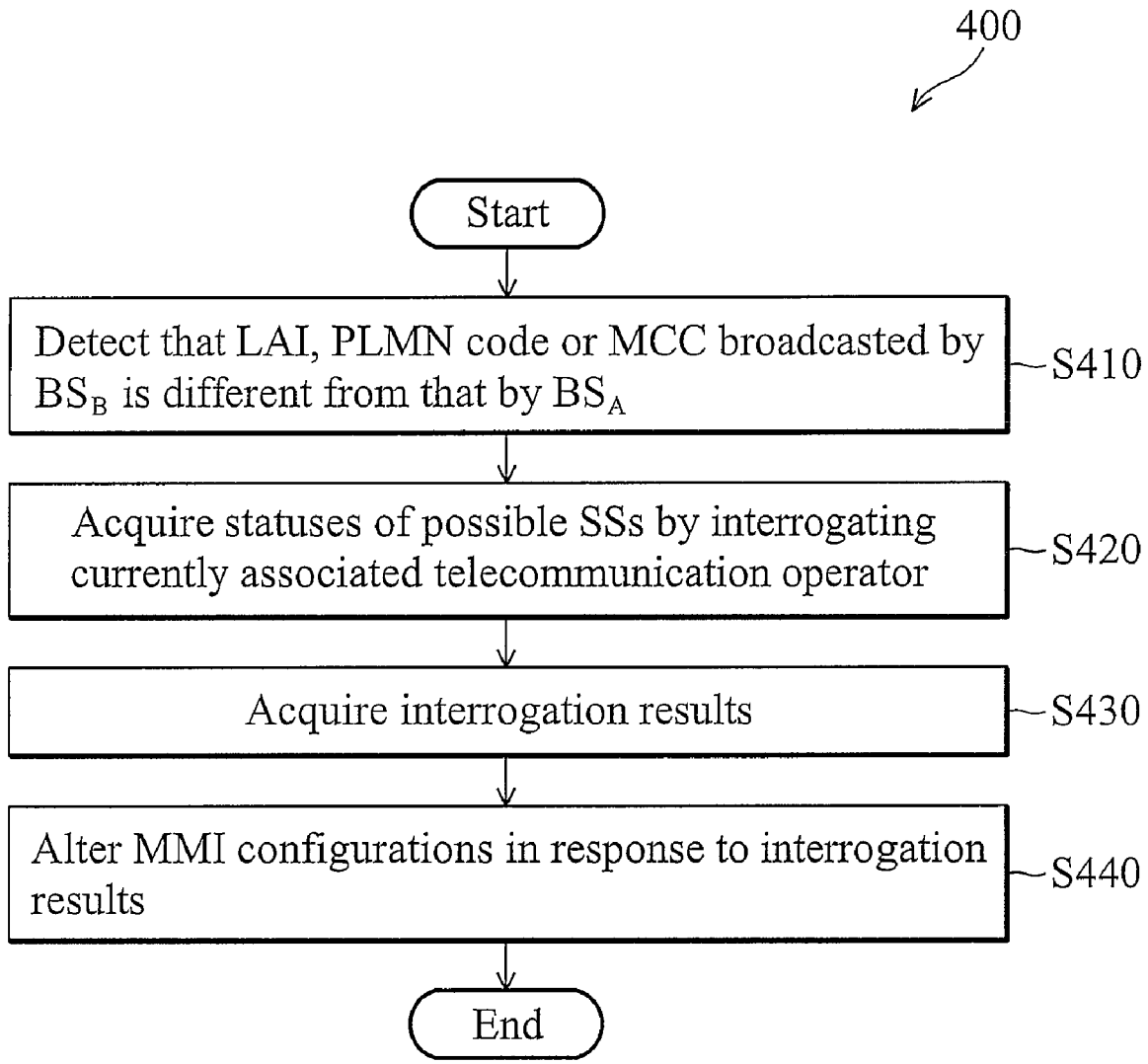
FIG. 4 is a flowchart showing an embodiment of a method for promptly altering MMI configurations applied in the scenario of FIG. 3 according to the invention.

FIG. 4 is a flowchart showing an embodiment of a method 400 for promptly altering MMI configurations applied in the scenario of FIG. 3 according to the invention. In step S410, the device 100 detects that LAI, PLMN code or MCC of system information broadcasted by $BS_B$ is different from that broadcasted by $BS_A$. In step S420, statuses of possible SSs (e.g. that present in the service information 144 of FIG. 1) are acquired by interrogating (i.e. issuing multiple interrogation requests to) a telecommunication operator currently associated via the base station system $BS_B$. In step S430, interrogation results (i.e. interrogation responses) are acquired. In step S440, MMI configurations of the device 100 are altered in response to the interrogation results. Note that the device 100 can be configured to perform steps S420 to S440 when detecting differences between LAIs, PLMN codes, MCCs, or any combinations of the above. That is, for an example, step S410 can be adjusted to detect that LAI, PLMN codes, MCCs, or any combinations of the above broadcasted by $BS_B$ is different from that by $BS_A$ according to the configuration.

Figure 5:
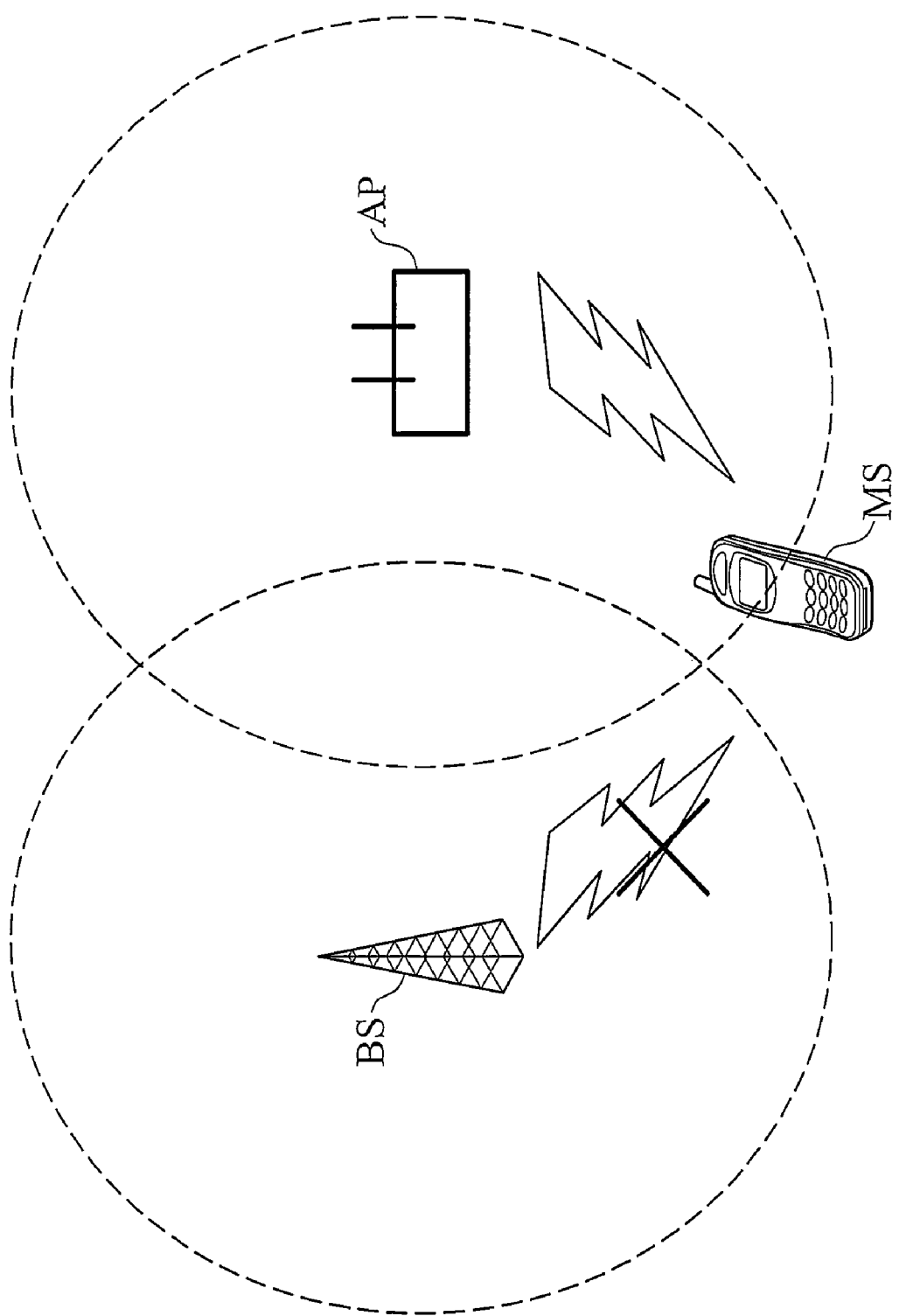
FIG. 5 is a diagram illustrating a scenario that a device is switchingly associated with an access point (AP) of a wireless network according to the invention.

FIG. 5 is a diagram illustrating a scenario that a device is switchingly associated with an access point (AP) of a wireless network according to the invention. In this scenario, the device MS may disconnect from a wireless telephony network (e.g. the GSM, EDGE, WCDMA, TDS-CDMA network) and connect to (i.e. associates with) a wireless network (e.g. the Wi-Fi network) via the AP.

Figure 6:
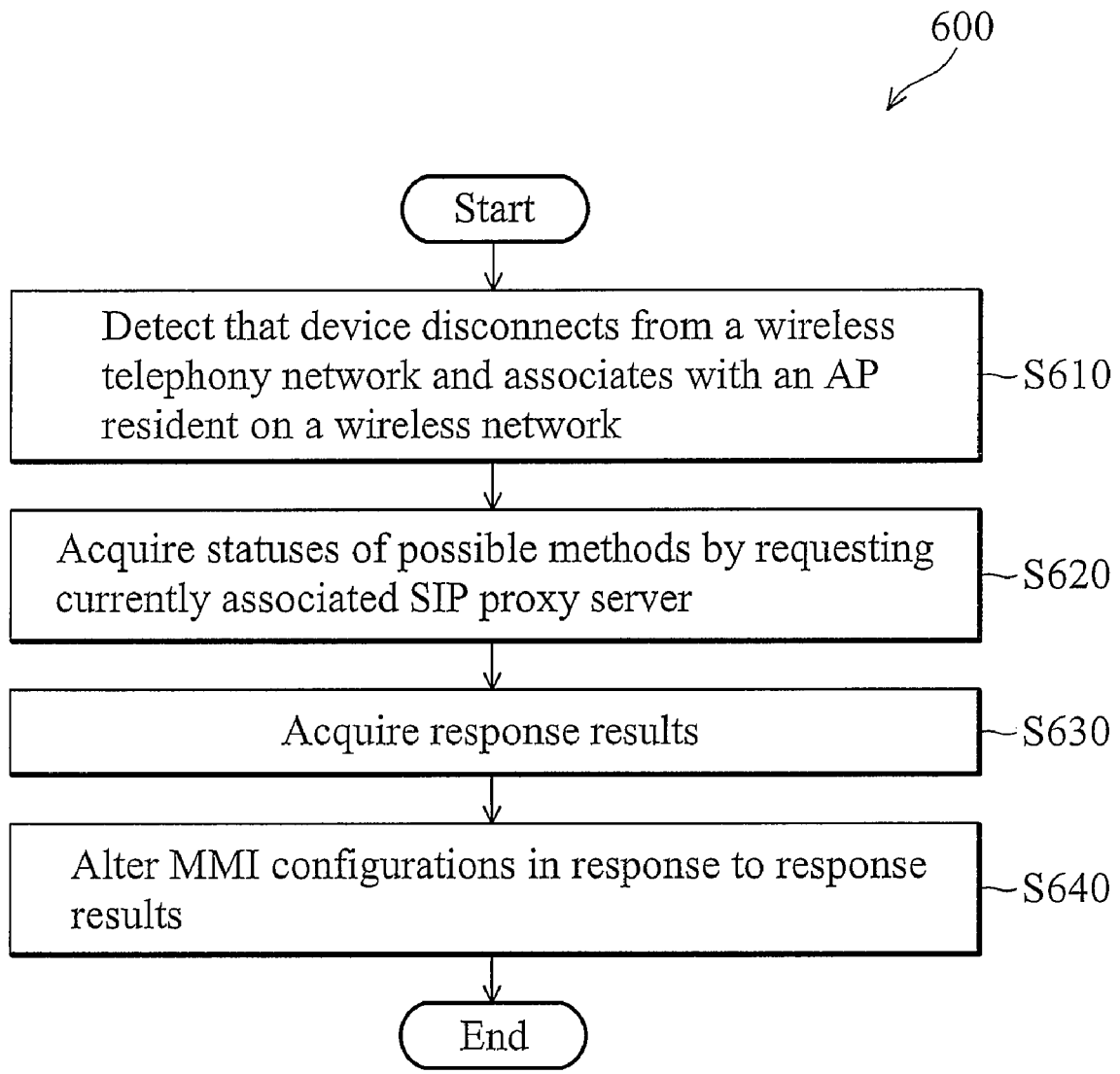
FIG. 6 is a flowchart showing an embodiment of a method for promptly altering MMI configurations applied in the scenario of FIG. 5 according to the invention.

FIG. 6 is a flowchart showing an embodiment of a method 600 for promptly altering MMI configurations applied in the scenario of FIG. 5 according to the invention. In step S610, the device 100 disconnects from a wireless telephony network and associates with an AP resident on a wireless network. In step S620, statuses of possible methods are acquired by requesting a destination device or current associated SIP proxy server. In step S630, response results are acquired. For example, the aforementioned SIP method OPTIONS can be utilized to acquire statuses of supported methods, and thereafter, response results can be acquired from the aforementioned HEADER field of a corresponding OPTIONS response. In step S640, MMI configurations of the device 100 are altered in response to the response results. It is to be understood that MMI configurations of the device 100 are also altered to disable menu items corresponding to SSs supported by the wireless telephony network, or remove the menu items from a service menu. Those skilled in the art may modify step S610 to perform the remaining steps of the method 600 (i.e. steps S620 to S640) when the device 100 associates with the AP resident on the wireless network, that is, the device 100 does not disconnect from a wireless telephony network. Step S640 is therefore modified to maintain the current display property values of menu items corresponding to SSs supported by the wireless telephony network.

Figure 7:
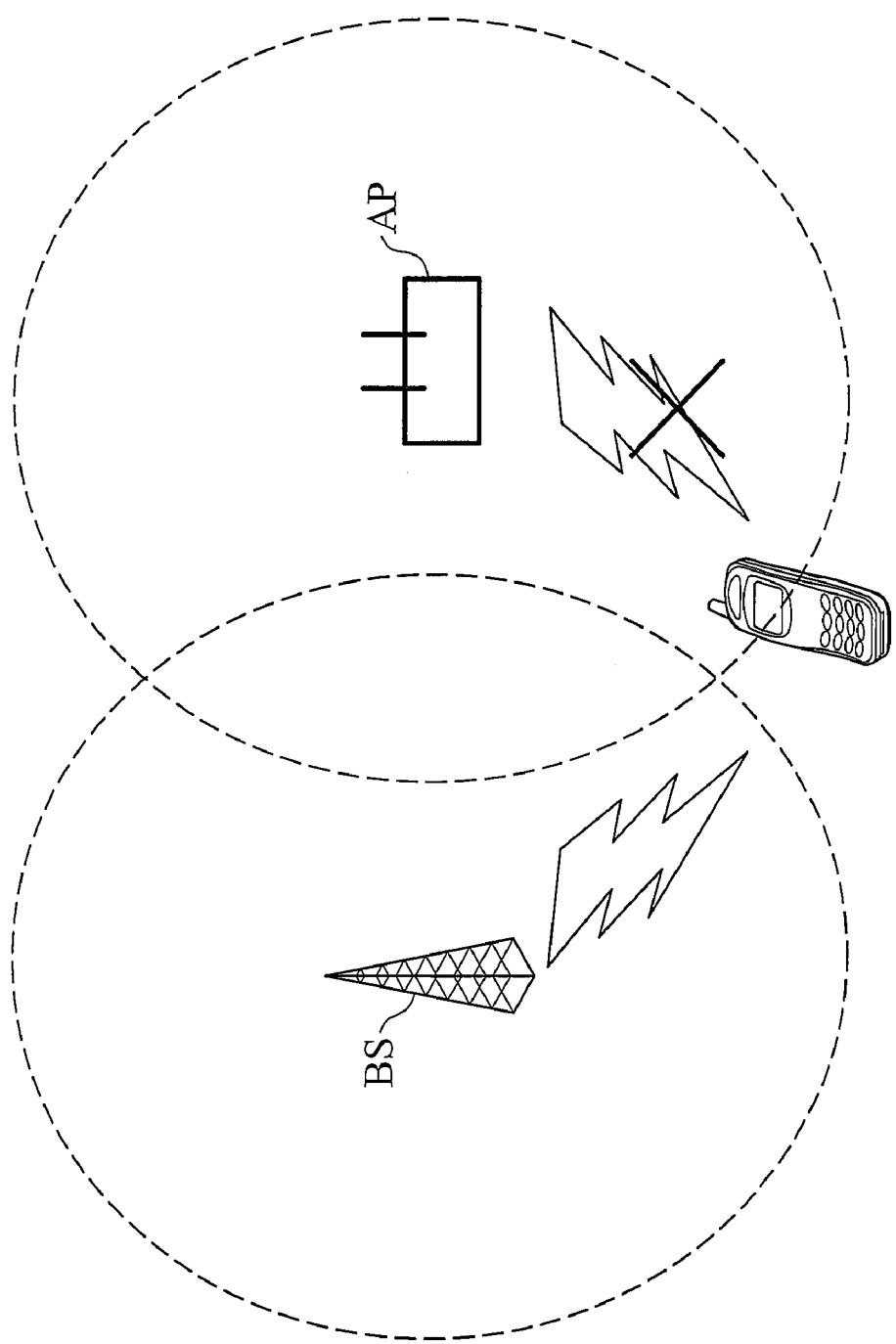
FIG. 7 is a diagram illustrating a scenario that a device is switchingly associated with a base station system of a wireless telephony network according to the invention.

FIG. 7 is a diagram illustrating a scenario that a device is switchingly associated with a base station system of a wireless telephony network according to the invention. In this scenario, the device may disconnect from a wireless network (e.g. the Wi-Fi network) and connect to (i.e. associates with) a wireless telephony network (e.g. the GSM, EDGE, WCDMA, TDS-CDMA network) via the base station system BS.

Figure 8:
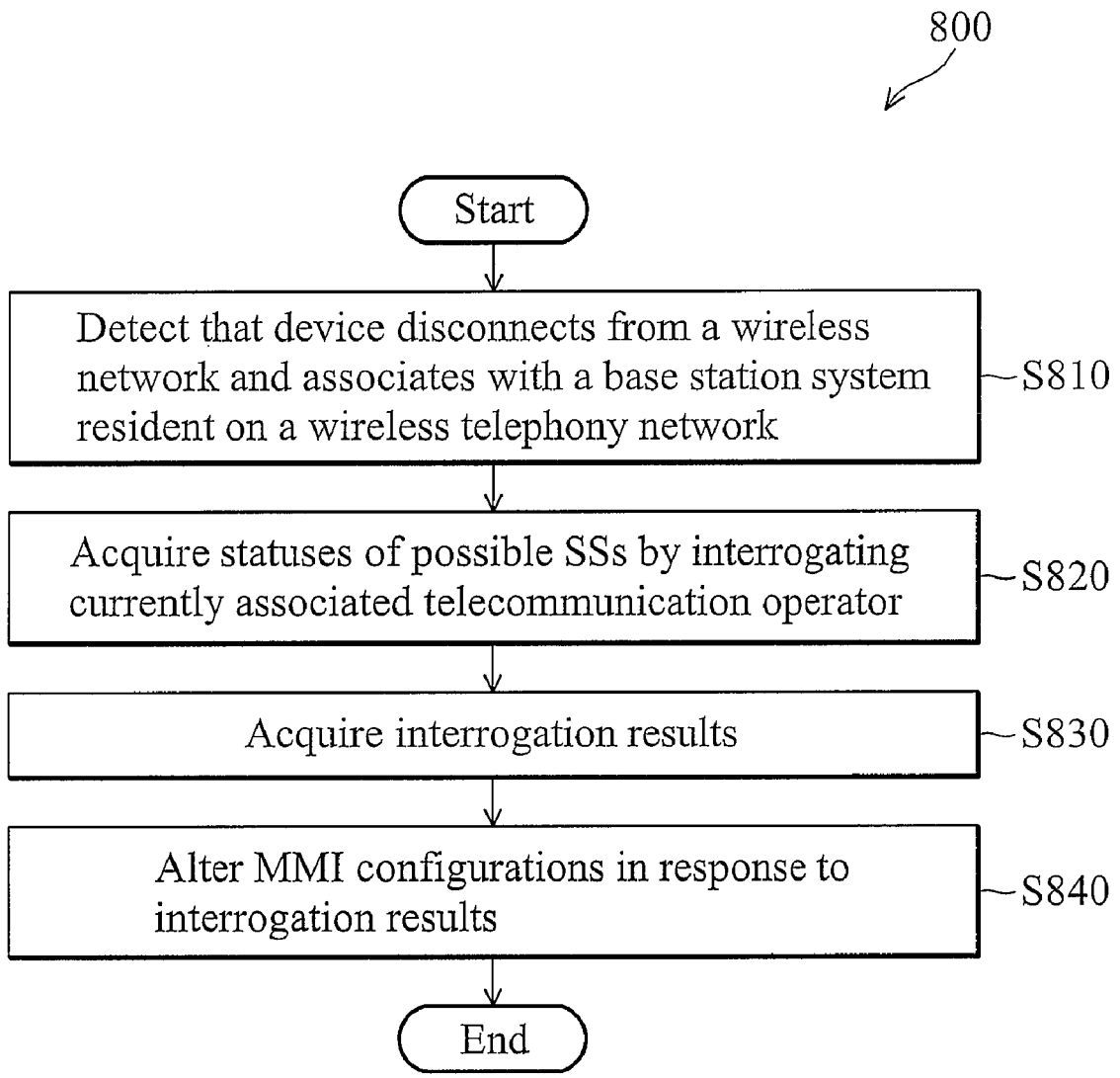
FIG. 8 is a flowchart showing an embodiment of a method for promptly altering MMI configurations applied in the scenario of FIG. 7 according to the invention.

FIG. 8 is a flowchart showing an embodiment of a method 800 for promptly altering MMI configurations applied in the scenario of FIG. 7 according to the invention. In step S810, the device 100 disconnects from a wireless network and associates with a base station system resident on a wireless telephony network. In step S820, statuses of possible SSs are acquired by interrogating the currently associated telecommunication operator. In step S830, interrogation results are acquired. In step S840, MMI configurations of the device 100 are altered in response to the interrogation results. It is to be understood that MMI configurations of the device 100 are also altered to disable menu items corresponding to supported methods supported by the wireless network, or remove the menu items from a service menu. Those skilled in the art may modify step S810 to perform the remaining steps of the method 800 (i.e. steps S820 to S840) when the device 100 associates with the base station system resident on the wireless telephony network, that is, the device 100 does not disconnect from a wireless network. Step S840 is therefore modified to maintain the current display property values of menu items corresponding to supported methods supported by the wireless network.

The described embodiments for dynamic menu updating, or certain aspects or portions thereof, may be practiced in logic circuits, or may take the form of a program codes (i.e., instructions) embodied in tangible media, such as floppy diskettes, CD-ROMS, hard drives, or any other machine-readable storage medium, wherein, when the program codes are loaded into and executed by a machine, such as a smart phone, a mobile phone, or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, the machine becomes an apparatus for practicing the invention. When implemented on a general-purpose processor (e.g. 120 of FIG. 1), the program codes combine with the processor to provide a unique apparatus that operate analogously to specific logic circuits.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A method for altering man machine interface (MMI) configurations for use in a device, comprising:
   determining whether a first location information received from a first cell broadcast system resident on a currently associated network is different from a second location information stored in a volatile or non-volatile storage device, or whether a first network information received from the first cell broadcast system resident on the currently associated network is different from a second network information stored in the volatile or non-volatile storage device, wherein the first location information indicates a geographic area where the first cell broadcast system situates, the first network information indicates a first network operator providing communication services of the currently associated network, the second location information or the second network information is received from a second cell broadcast system resident on a previously associated network, the second location information indicates a geographic area where the second cell broadcast system situates, and the second network information indicates a second network operator providing communication services of the previously associated network;

querying a status of a supplementary service (SS by issuing a supplementary service (SS) interrogation request to a currently associated network when the first location information is different from the second location information or the first network information is different from the second network information, wherein the SS modifies or supplements a basic telecommunication service;

acquiring the queried status carried by a SS interrogation response from the currently associated network;

enabling a menu item of a service menu when the queried status indicates that the service is available; and disabling the menu item of the service menu or removing the menu item from the service menu when the queried status indicates that the service is unavailable, preventing a user from requesting the service via the menu item.

2. The method of claim 1, wherein the first or second location information comprises a location area identity (LAI), and the first or second network information comprises a Public-Land-Mobile-Network (PLMN) code, and the determining step further comprises:

listening to a control channel provided by the first cell broadcast system, and receiving the first location information or the first system information from the control channel.

3. The method of claim 1, wherein the querying step further comprises:

querying the status of the service when disconnecting from a wireless telephony network and switchingly associating with a wireless network.

4. The method of claim 3, wherein the wireless telephony network is the Global System for Mobile Communications (GSM) network and the wireless network is the Wi-Fi network.

5. The method of claim 3, wherein the request is a session initiation protocol (SIP) method "OPTIONS" issuing to a SIP server, the queried status is returned in a "Supported" header field of a return message.

6. The method of claim 1, wherein the querying step further comprises:

querying the status of the service when disconnecting from a wireless network and switchingly associating with a wireless telephony network.

7. The method of claim 6, wherein the wireless telephony network is the Global System for Mobile Communications (GSM) network and the wireless network is the Wi-Fi network.

8. The method of claim 6, wherein the request is a supplementary service (SS) interrogation request, the queried status is carried by a SS interrogation response from the currently associated network, and the SS request modifies or supplements a basic telecommunication service provided by the currently associated network.

9. A device, comprising:

a storage device, storing man-machine interface (MMI) configurations; and a processing unit, querying a status of a supplementary service (SS) by issuing a supplementary service (SS) interrogation request to a currently associated network after detecting that a first location information is different from a second location information or a first network information is different from a second network information, wherein the SS modifies or supplements a basic telecommunication service, acquiring the queried status carried by a SS interrogation response from the currently associated network, enabling a menu item of a service menu by altering the stored MMI configurations when the queried status indicates that the service is available, disabling the menu item of the service menu or removing the menu item from the service menu by altering the stored MMI configurations when the queried status indicates that the service is unavailable, preventing a user from requesting the service via the menu item, and directing a display unit to display the menu item of the service menu according to the altered MMI configurations, wherein the first location information is received from a first cell broadcast system resident on a currently associated network, and indicates a geographic area where the first cell broadcast system situates, the second location information is stored in a volatile or non-volatile storage device, and indicates a geographic area where the second cell broadcast system resident on a previously associated network situates, the first network information is received from the first cell broadcast system resident on the currently associated network, and indicates a first network operator providing communication services of the currently associated network, and the second network information is stored in the volatile or non-volatile storage device, and indicates a second network operator providing communication services of the previously associated network.

10. The device of claim 9, further comprising a baseband unit, wherein the first or second location information comprises a location area identity (LAI), the first or second network information comprises a Public-Land-Mobile-Network (PLMN) code, and the processing unit listens to a control channel provided by the first cell broadcast system, and receives the first location information or the first system information from the control channel via the baseband unit.

11. The device of claim 9, wherein the processing unit stores service information comprising the SS with the queried status for indicating whether the SS is supported by the currently associated network.

12. The device of claim 9, wherein the MMI configurations further comprises the menu item with a display property for indicating whether the menu item is enabled, disabled or removed.

* * * * *